(12) United States Patent
Peng et al.

(10) Patent No.: US 7,461,563 B1
(45) Date of Patent: Dec. 9, 2008

(54) BI-DIRECTIONAL ORIFICE PLATE ASSEMBLY

(75) Inventors: Junmei Peng, Pearland, TX (US); Gregory Theron Jay, Katy, TX (US); Gary Allen Tatum, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 11/851,583

(22) Filed: Sep. 7, 2007

(51) Int. Cl.
*G01F 1/37* (2006.01)

(52) U.S. Cl. .................................. 73/861.52
(58) Field of Classification Search .............. 73/861.52, 73/861.22, 861.24, 861.63, 861.65
See application file for complete search history.

(56) References Cited

U.S. PATENT DOCUMENTS

| | | | |
|---|---|---|---|
| 4,478,251 A | 10/1984 | Sanchez et al. | |
| 4,638,672 A * | 1/1987 | McCall | 73/861.52 |
| 5,069,252 A | 12/1991 | Kendrick et al. | |
| 5,085,250 A | 2/1992 | Kendrick | |
| 5,318,073 A | 6/1994 | Kendrick et al. | |
| 7,284,450 B2 * | 10/2007 | Orleskie et al. | 73/861.52 |
| 2006/0231149 A1 | 10/2006 | Kulkarni | |

* cited by examiner

*Primary Examiner*—Jewel V Thompson
(74) *Attorney, Agent, or Firm*—Conley Rose, P.C.

(57) ABSTRACT

A bi-directional orifice plate assembly is disclosed. In an embodiment, the orifice plate assembly includes a first ring member, a second ring member, an orifice plate disposed between the first and second ring members, a first seal assembly disposed between the first ring member and the orifice plate, and a second seal assembly disposed between the second ring member and the orifice plate. The first ring member includes a first plurality of arms having latching portions, and the second ring member includes a second plurality of arms having latching portions. Both ring members include latch-receiving recesses. The latching portions of the arms of the first ring member engage the latch-receiving recesses of the second ring member, while the latching portion of the arms of the second ring member engage the latch-receiving recesses in the first ring member.

25 Claims, 5 Drawing Sheets

BI-DIRECTIONAL ORIFICE PLATE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Art

This disclosure relates generally to orifice fittings for measuring fluid flow rates. More particularly, the disclosure relates to an orifice plate assembly for use in orifice fittings.

2. Description of Related Art

Fluid flow rate is the quantification of bulk fluid or gas movement, typically measured as volumetric and mass flow rates. The ability to measure reliably and accurately fluid flow rates serves an important function in a variety of processes and industries (e.g, chemical processing, oil and gas transport and production, etc.).

An orifice fitting is one of many devices that may be used to measure volumetric or mass flow rate of fluids flowing through a pipe or conduit. An orifice fitting typically employs a flat, thin plate having a central orifice that is smaller in diameter than the diameter of the conduit in which the plate is disposed. The orifice plate is positioned between a sealing ring and a compression ring that are held together by a fastener to form an orifice plate assembly. The orifice plate assembly is disposed within a plate carrier, which is, in turn, supported and aligned within the orifice fitting. The mass fluid flow rate through the conduit is calculated from the pressure differential across the orifice plate, the static pressure, the temperature, the density of the fluid flowing through the conduit, the diameter of the conduit, and the orifice size.

When using an orifice plate to measure fluid flow, there are many factors to be considered in obtaining accurate flow measurements. The configuration and arrangement of seals within the orifice plate assembly is an important consideration. In particular, one or more seals may be provided in the orifice plate assembly to reduce the potential for flowing fluid to leak out of the orifice plate assembly between the orifice plate and sealing ring. Fluid leakage from the orifice plate assembly may result in erroneous flow measurements.

Conventionally, the seal ring is typically positioned on the upstream side of the orifice plate, and the compression ring is positioned on the downstream side of the orifice plate when the orifice plate assembly is positioned within the orifice fitting to measure flow rates. In some conventional orifice plate seal assemblies, a seal may be provided between the seal ring and orifice plate, but no seal is provided between the orifice plate and the compression ring. In such assemblies, if the compression ring side of the orifice plate assembly is inadvertently positioned upstream when the assembly is positioned within the orifice fitting, leakage may occur, thereby detrimentally affecting flow measurements. Thus, such assemblies are considered to be uni-directional, meaning such conventional assemblies may permit accurate flow measurements when flow passes through the assembly in one, but not both, directions.

The composition of the seals is also an important consideration. In some conventional orifice plate seal assemblies, the seal includes an elastomeric material. Depending on the fluid passing through the assembly, the seal material may be incompatible with the fluid. In instances when the seal material is incompatible with the fluid, leakage may result, again detrimentally affecting flow measurements.

The mechanism securing the sealing ring and compression ring about the orifice plate is yet another important consideration. In some conventional orifice plate seal assemblies, a metal clip is used to secure the assembly. This introduces manufacturing complexity due to an additional part that must be made within tight tolerances. In the event that the metal clip is not within design tolerances, leakage may result during use. Additionally, the assembly may come apart when the plate carrier is removed from the fitting. Over time, fluid passing through the assembly may corrode the metal in the clip, resulting in failure of the clip to securely hold the assembly together. This too may lead to leakage during use and/or the assembly coming apart during removal from the fitting.

In other conventional orifice plate seal assemblies, a locking mechanism securing the sealing ring and compression ring together is machined into the compression ring and/or sealing ring. For example, a lip may be machined in the compression ring to engage a matching groove in the sealing ring. As with the metal clip, this increases manufacturing complexity. Also, leakage may occur when the lip and groove are not manufactured within design tolerances. Moreover, the plastic behavior of the compression ring and sealing ring materials may limit the number of times these rings may be assembled, disassembled, and reassembled while still providing a secure locking mechanism for the assembly.

Lastly, the configuration and arrangement of the orifice plate assembly may impact tolerancing, manufacturing complexity, and associated manufacturing costs. In general, manufacturing costs of an orifice plate assembly may be reduced by reducing the number of components required to reliably seal the orifice plate. Additional components may result in additional inventory requirements (e.g., stock on-had of each component) at the operations site, may result in increased tolerancing demands for each individual part so that the combined orifice plate assembly is reliably sealed, and may require additional manufacturing/repair steps. Each of these consequences may contribute to increased manufacturing costs and complexities.

Thus, reliable means to seal the orifice plate of an orifice fitting are desirable. Methods and devices for orifice plate seal assemblies which ease manufacturing or installation complexities, or which reduce cost, would likewise be particularly desirable.

SUMMARY OF THE DISCLOSED EMBODIMENTS

In one embodiment, a bi-directional orifice plate assembly is disclosed for measuring flow rate through a conduit. The orifice plate assembly includes a first ring member, a second ring member, and an orifice plate. The first ring member includes a first facing surface and a first plurality of arms extending away from the first facing surface. The first plurality of arms include latching portions, while the first ring member also includes latch-receiving recesses. The second ring member includes a second facing surface and a second plurality of arms extending away from the second facing surface. The second plurality of arms include latching portions, while the second ring member also includes latch-receiving recesses. The orifice plate is disposed between the first and second facing surfaces of the ring members. The latching portions of the arms of the first ring member engaging the latch-receiving recesses of the second ring member, and the latching portion of the arms of the second ring member engaging the latch-receiving recesses in the first ring member.

In some embodiments, the orifice plate assembly also includes a first seal assembly disposed between the first ring and the orifice plate, and a second seal assembly disposed between the second ring and the orifice plate.

In an embodiment, the orifice fitting includes a tubular body having a through passage and an orifice plate assembly removably disposed within the tubular body across the through passage.

The foregoing has outlined rather broadly features of disclosed embodiments in order that the detailed description that follows may be better understood. Additional features will be described hereinafter that form the subject of certain of the claims.

BRIEF DESCRIPTION OF THE DRAWINGS

For a detailed description of the various embodiments, reference will now be made to the accompanying drawings in which.

DETAILED DESCRIPTION OF THE DISCLOSED EMBODIMENTS

Figure 1:
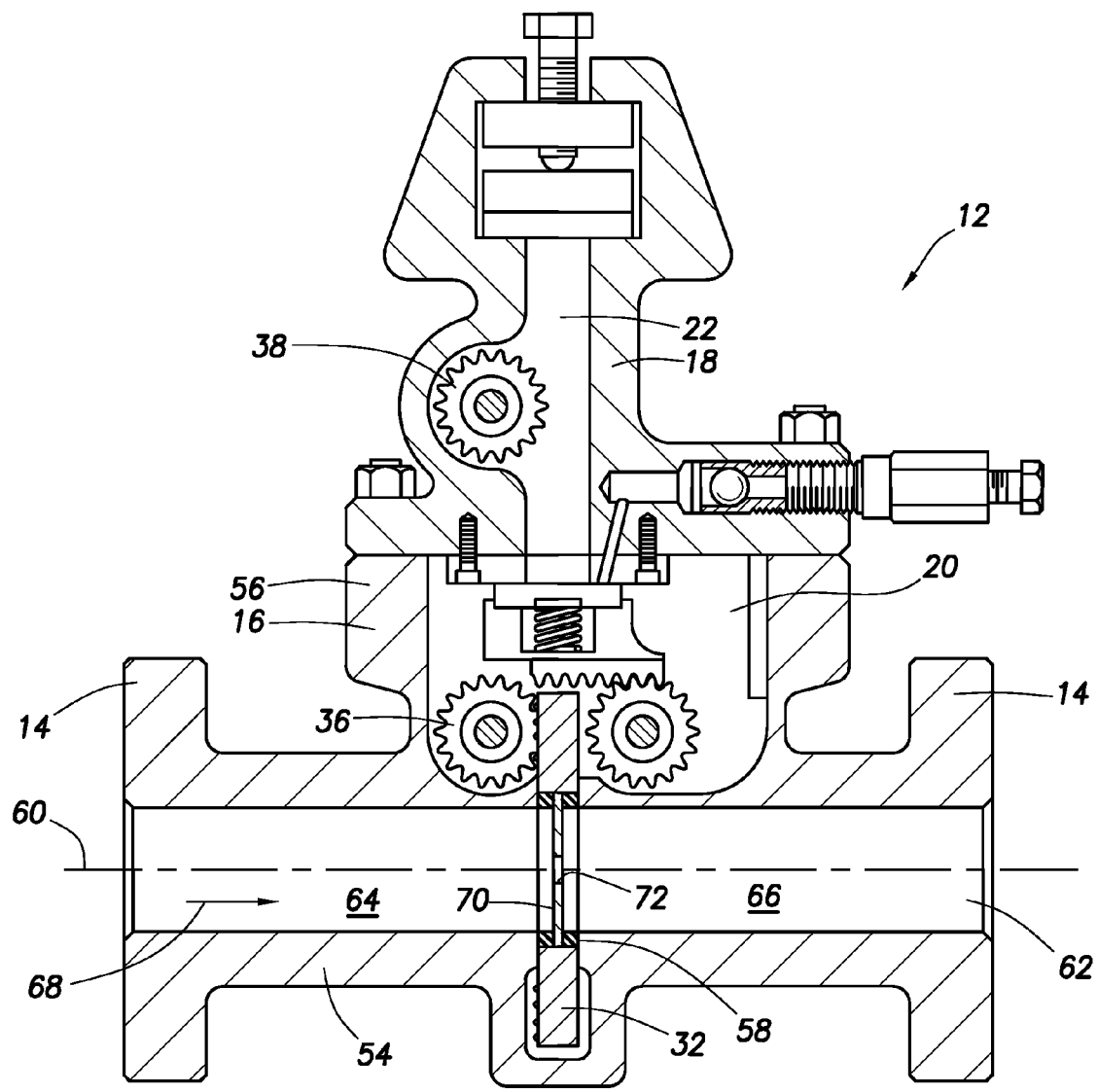
FIG. 1 illustrates a cross-sectional view of an orifice fitting having a bi-directional orifice plate assembly made in accordance with principles described herein.

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

FIG. 1 illustrates a cross-sectional view of an orifice fitting 12 with a bi-directional orifice plate assembly 72 installed therein. As illustrated, orifice fitting 12 includes body 16 and top 18. Body 16 further includes flanges 14, conduit 54, plate carrier guide 58, and upper housing 56. Flanges 14 are used to bolt orifice fitting 12 to sections of a pipeline (not shown). Conduit 54 has a central axis 60 and a through passage 62 through which a fluid flows from an upstream region 64 to a downstream region 66 generally in the direction of arrow 68. Plate carrier guide 58 serves as a guide to properly locate, align, and position plate carrier 70 within orifice fitting 12 when plate carrier 70, containing orifice plate assembly 72, is inserted or removed from orifice fitting 12. Specifically, plate carrier guide 58 orients plate carrier 70 such that orifice plate assembly 72 is substantially perpendicular to the direction of fluid flow, indicated by arrow 68. Upper housing 56 encloses lower chamber 20. Lower drive 36, having a gear shaft and pinions, is located within lower chamber 20. Top 18 encloses upper chamber 22. Upper drive 38, also having a gear shaft and pinions, is located within upper chamber 22. Plate carrier 70 may be raised and lowered within orifice fitting 12 by operating lower drive 36 and upper drive 38.

Figure 3:
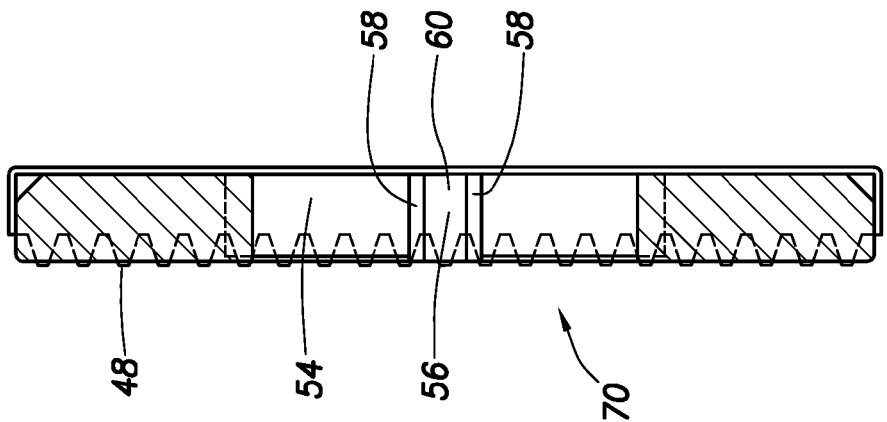
FIG. 3 is a cross-sectional side view of the plate carrier of FIG. 2.
Figure 2:
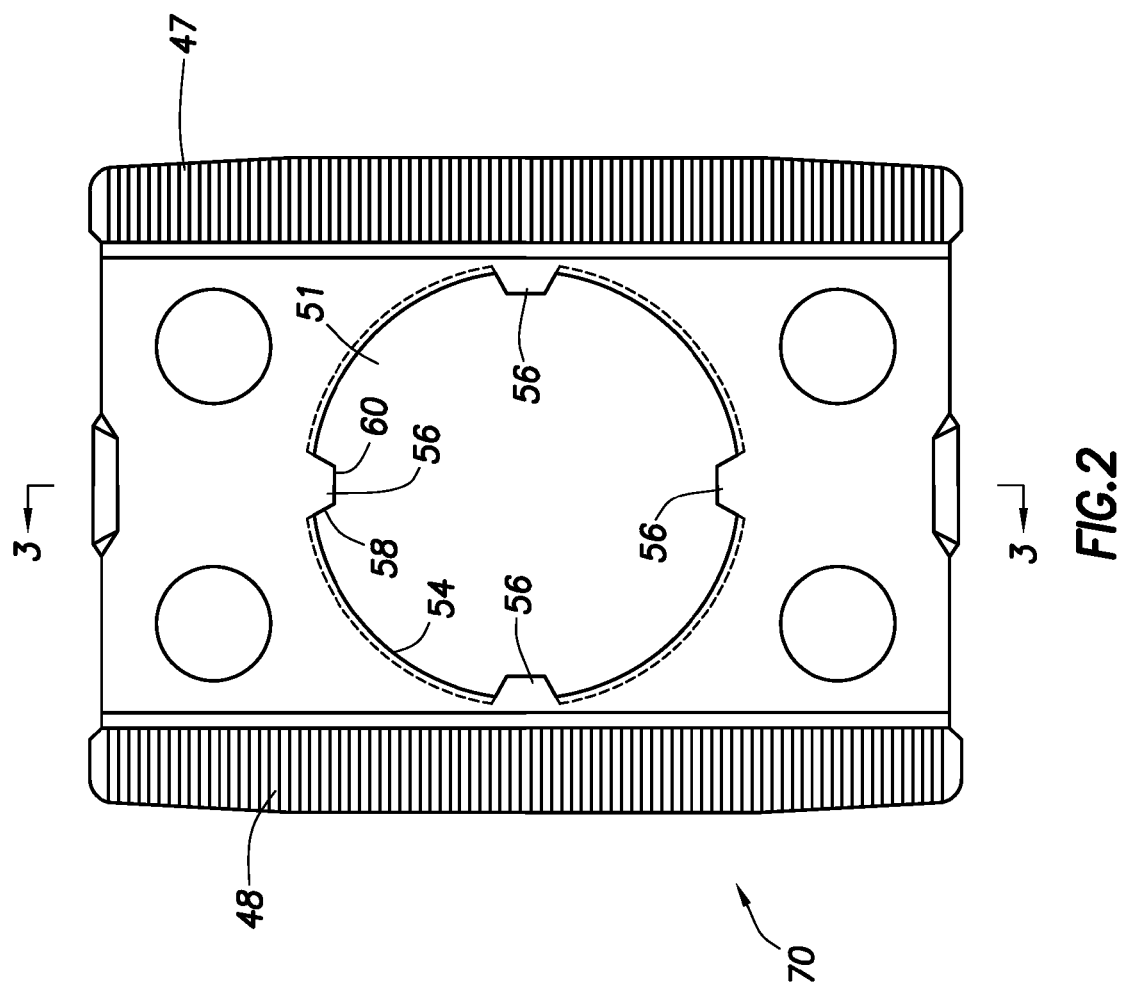
FIG. 2 is a front, elevation view of the plate carrier of FIG. 1.

Referring to FIGS. 2 and 3, plate carrier 70 further includes parallel racks 47, 48, inner circumference 54, opening 51, and ears 56. Racks 47, 48 are adapted to interface with lower drive 36 and upper drive 38 to enable raising and lowering of plate carrier 70 within plate carrier guide 58 of orifice fitting 12. Inner circumference 54 bounds opening 51 and is generally circular in shape but includes ears or protrusions 56 projecting into opening 51. Opening 51 is configured to receive orifice plate assembly 72 therein. In some embodiments, ears 56 may be generally trapezoidal in shape, having sloping sides 58 and interior surface 60.

Figure 4:
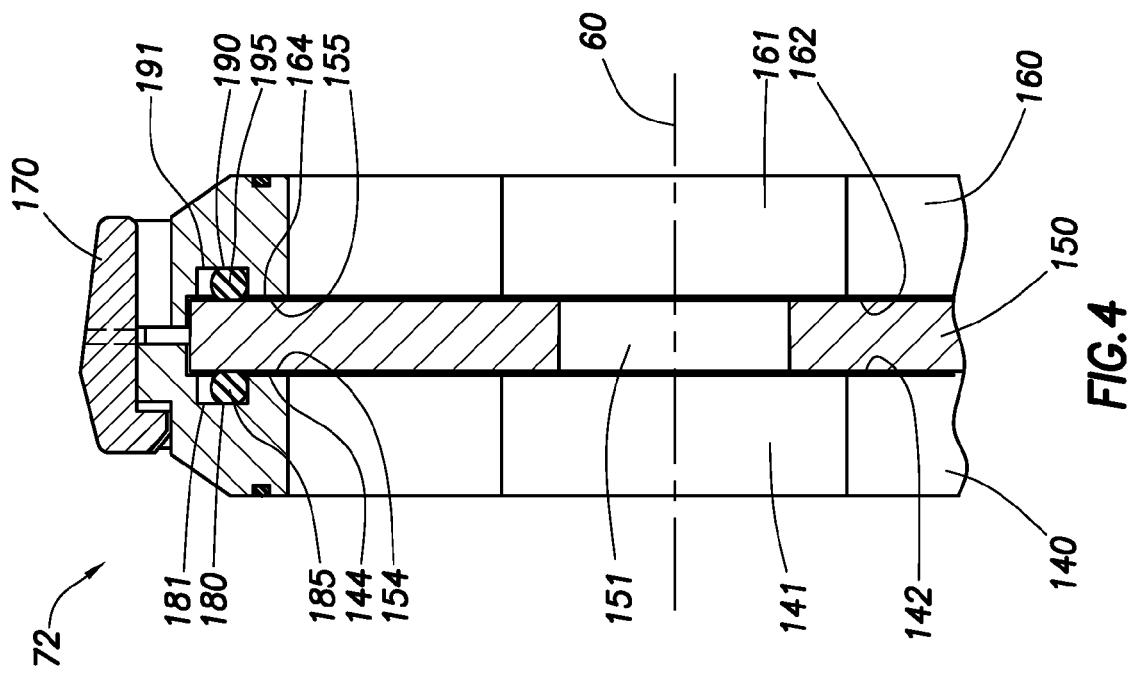
FIG. 4 is a partial cross-sectional side view of the bi-directional orifice plate assembly of FIG. 1.

Referring now to FIG. 4, orifice plate assembly 72 includes a first ring 140, an orifice plate 150, a second ring 160, and seals 180, 190. Orifice plate 150 is removably disposed between first ring 140 and second ring 160. Specifically, first ring 140 and second ring 160 engage the outermost radial portions of orifice plate 150. Orifice plate 150 is securely held and aligned between first ring 140 and second ring 160 by one or more fasteners or snaps 170 that clamp the outer radial portions of second ring 160 to the outer radial portions of first ring 140, thereby holding orifice plate assembly 72 together. Further, each snap 170 holds first ring 140, orifice plate 150, and second ring 160 together, so that orifice plate assembly 72 may be disposed in plate carrier 70 and installed in orifice fitting 12.

Orifice plate 150 is a relatively flat thin plate having facing surfaces 154, 155 and an orifice plate bore 151 substantially in the center. Orifice plate bore 151 may be cast or molded as part of orifice plate 150 or machined from orifice plate 150. Orifice plate bore 151 has a diameter less than the diameter of passage 62 of orifice fitting 12. In this manner, fluid flow from upstream region 64 to downstream region 66 is restricted by orifice plate 150. As a result, the fluid pressure upstream orifice plate 150 is greater than the fluid pressure downstream of orifice plate 150. Small access pressure ports or pressure taps (not shown) may be provided on each side of orifice plate 150 to permit the measurement of pressure differentials across orifice plate 150. The measured pressure differentials may be then used to calculate fluid flow rate through orifice fitting 12 shown in FIG. 1.

Referring still to FIG. 4, first ring 140 and second ring 160 each include a through hole 141, 161, respectively, having a diameter slightly larger than that passage 62 of orifice fitting 12. In this manner, neither first ring 140 nor second ring 160 restricts or otherwise impacts fluid flow through orifice fitting 12. In other embodiments, hole 141 and/or hole 161 may have a diameter substantially equal to or significantly larger than that of passage 62. Further, first ring 140 and second ring 160 each include an annular step or recess 142, 162, respectively, on its inner facing surface that accommodates orifice plate 150 when orifice plate 150 is disposed between first ring 140 and second ring 160.

Seal 180 is disposed between first ring 140 and orifice plate 150 to prevent fluid loss between these two components. In particular, seal 180 provides a fluid tight seal between facing surface 144 of first ring 140 and facing surface 154 of orifice plate 150. In the embodiment illustrated in FIG. 4, seal 180 is an O-ring 185 seated within a peripheral annular groove 181 disposed around hole 141 in first ring 140 that sealingly engages facing surface 154 of orifice plate 150. Annular groove 181 may be molded or machined as part of first ring 140 at a predetermined location. O-ring 185 may be maintained within groove 181 by any suitable means including without limitation a pressure fit, adhesive, or combinations thereof. In this configuration, seal 180 prevents fluid leakage from orifice fitting 12, which may otherwise detrimentally impact the accuracy of flow measurements of fluid flowing through orifice fitting 12.

Seal 190 is disposed between second ring 160 and orifice plate 150 to prevent fluid loss between these two components. In particular, seal 190 provides a fluid tight seal between facing surface 164 of second ring 160 and facing surface 155 of orifice plate 150. In the embodiment illustrated in FIG. 4, seal 190 is an O-ring 195 seated within a peripheral annular groove 191 disposed around hole 161 in second ring 160 that sealingly engages facing surface 155 of orifice plate 150. Annular groove 191 may be molded or machined as part of second ring 160 at a predetermined location. O-ring 195 may be maintained within groove 191 by any suitable means including without limitation a pressure fit, adhesive, or combinations thereof. In this configuration, seal 190 prevents fluid leakage from orifice fitting 12, which may otherwise detrimentally impact the accuracy of flow measurements of fluid flowing through orifice fitting 12.

Each O-ring 185, 195 may include any suitable material capable of creating a fluid tight seal between two surfaces (e.g., the engaging sealing surfaces between first ring 140 and orifice plate 160) including without limitation metals (e.g., tin, lead, etc.), non-metals (plastic, polymer, rubber, composite, etc.) or combinations thereof. O-ring 185 may be the same material or different material than O-ring 195. As previously discussed, each O-ring 185, 195 preferably includes a resilient material that deforms elastically to create a seal when compressed. For example, in some embodiments, O-rings 185, 195 includes an elastomeric rubber. In addition, each O-ring 185, 195 may include a corrosive resistant material and/or have a corrosive resistant coating to resist detrimental seal degradation caused by corrosive fluid flowing through orifice fitting 12.

Although each seal 180, 190 is described above as comprising an O-ring type seal, in general, each seal of orifice plate assembly 72 may include any suitable type of seal member or assembly capable of creating a fluid tight seal between two surfaces. Examples of suitable seals include without limitation O-ring seals, lip seals, wiper seals, dynamic seals, static seals, or combinations thereof. Further, each seal 180, 190 within orifice plate assembly 72 may be the same or different in configuration. For example, in the embodiments exemplified by FIG. 4, seal 180 is substantially the same as seal 190.

Generally, O-ring type seals are preferred for each seal 180, 190 for a variety of reasons. O-rings are typically available in variety materials (e.g., corrosive resistant materials) and sizes. Also, O-rings are easily replaceable, and O-ring seal assemblies are easily assembled. Moreover, the use of O-ring seals eliminates reliance on intricate seals that are cast, molded or machined as integral part of first plate 140 and/or second plate 160, etc.

Figure 5:
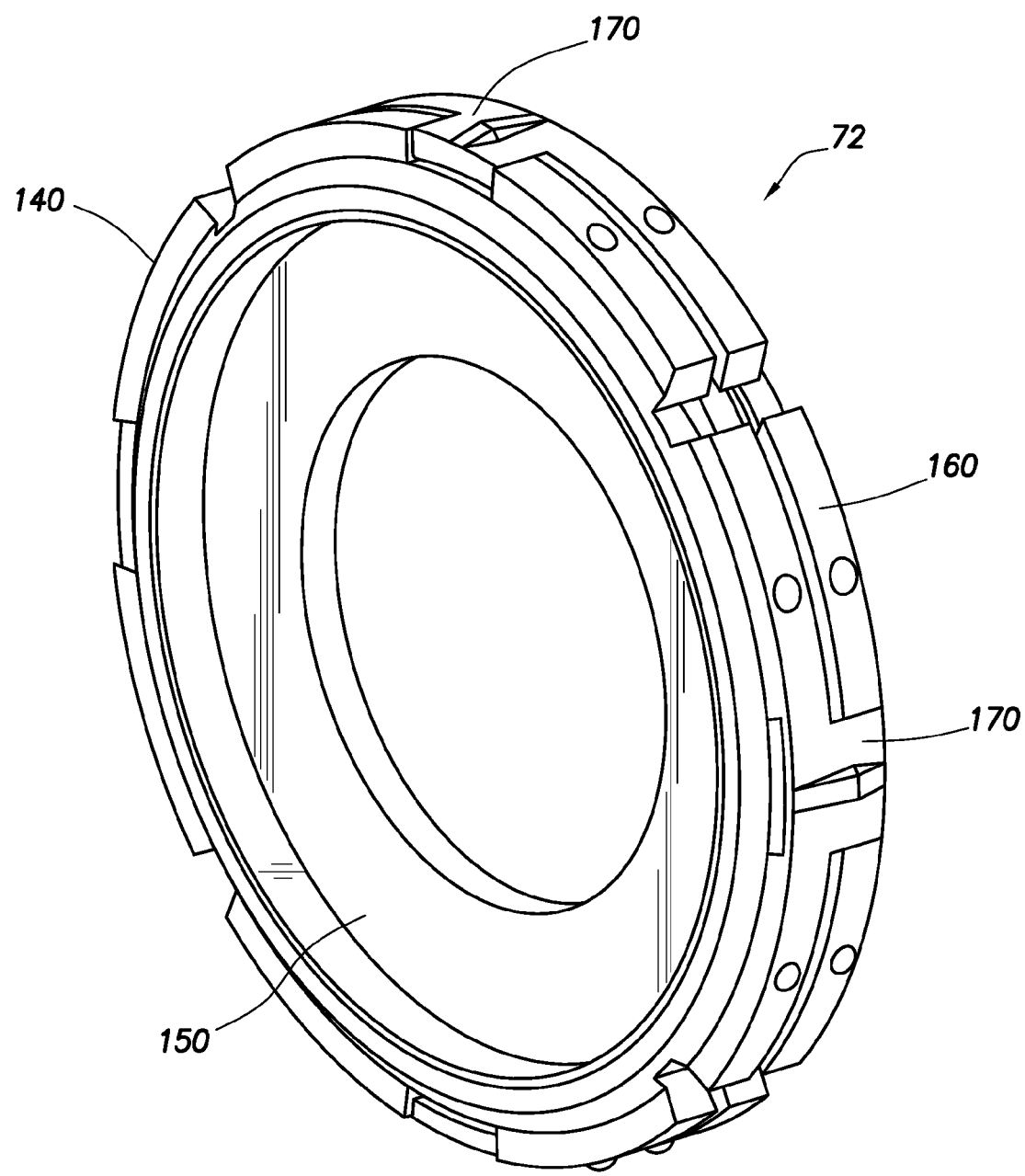
FIG. 5 is a perspective view of the bi-directional orifice plate assembly of FIGS. 1 and 4.

Referring now to FIG. 5, orifice plate assembly 72 is shown to include orifice plate 150 disposed between first ring 140 and second ring 160. Orifice plate 150 is securely held and aligned between first ring 140 and second ring 160 by four snaps 170 evenly spaced along the circumference of assembly 72. Although the embodiments exemplified by FIG. 5 include four snaps 170, other embodiments of the bi-directional orifice plate assembly may have as few as one or more than four snaps 170. Moreover, while snaps 170 are evenly spaced along the circumference of assembly 72, snaps 170 may be unevenly distributed in other embodiments.

Figure 6:
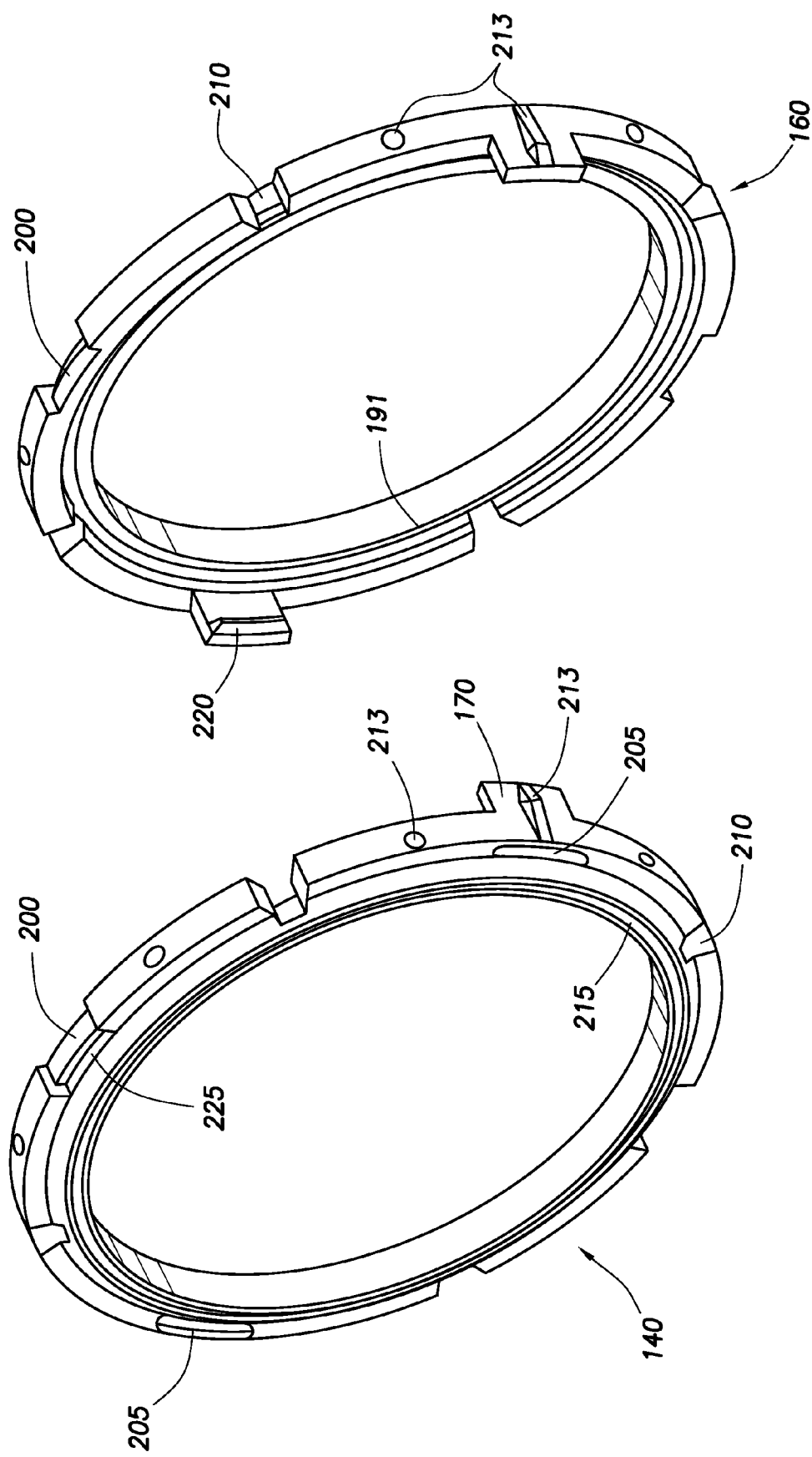
FIG. 6 is a perspective view of the sealing rings of the orifice plate of FIGS. 4 and 5.

As shown in FIG. 6, first ring 140 is depicted on the left and second ring 160 is on the right. In some embodiments, including those depicted in FIG. 6, first ring 140 and second ring 160 are identical. An orifice plate assembly including identical first and second rings 140, 160 and accompanying seals 180, 190 is bi-directional. A bi-directional orifice plate assembly may be inserted into plate carrier 72 with either first ring 140 or second ring 160 facing upstream, i.e. either first ring 140 or second ring 160 may be adjacent to upstream region 64. One advantage of a bi-directional orifice plate assembly is that when the ring in contact with plate carrier 70 becomes worn due to abrasions caused by repeated installation and removal from plate carrier 70, the orifice plate assembly may be flipped so that the other ring contacts plate carrier 70 instead. Thus, the service life of the bi-directional orifice plate assembly may be extended substantially beyond that of a conventional uni-directional orifice plate assembly. Moreover, such flipping will have no impact to the accuracy of pressure measurements, and therefore, calculated fluid flows.

Since the rings 140, 160 shown in FIG. 6 are identical, the following description applies equally to both. Rings 140, 160 include annular grooves 181, 191 wherein O-rings 185, 195 may be seated, as described above. Also, each ring 140, 160 includes along its circumference two snaps 170 equally spaced, two snap engagement segments 200 also equally spaced but offset from snaps 170 by ninety degrees, two injection recesses 205, four notches 210 and a plurality of buttons or projections 213. Ring 140 also includes annular face groove 215 located near its periphery. Although not visible in FIG. 6, ring 160 also includes an identical face groove in the same location.

In some embodiments, rings 140, 160 are injection molded from Teflon, or other similar material known in the industry. Injection recesses 205 are a result of the injection molding process during manufacturing of rings 140, 160. Injection molding permits reduced manufacturing costs in comparison to levels associated with machining these parts from bar stock. In addition to reduced manufacturing costs, injection molding enables the production of rings 140, 160 to within tight design tolerances, thereby reducing the possibility of leakage and/or unintentional disassembly when a plate carrier holding an orifice plate assembly including rings 140, 160 is handled when either removing or installing the orifice plate assembly within an orifice fitting. Teflon is particularly suited for exposure to highly corrosive fluids. Moreover, the elastic behavior of Teflon enables snaps 170 to provide a secure locking mechanism for orifice plate assembly 72, even after repeated assembly, disassembly, and reassembly of orifice plate assembly 72.

An orifice plate may be securely held and aligned between first ring 140 and second ring 160 by one or more snaps 170, as shown in FIG. 5. Snaps 170 on ring 160 clamp the outer radial portions of second ring 160 to the outer radial portions of first ring 140. Similarly, snaps 170 on ring 140 clamp the outer radial portions of second ring 160. More specifically, each snap 170 of ring 140 engages a recessed snap engagement segment 200 on ring 160, and each snap 170 of ring 160 engages a recessed snap engagement segment 200 on ring 140. Thus, a total of four snaps 170 engage four engagement segments 200 to securely hold an orifice plate between rings 140, 160.

Once assembled, orifice plate assembly 72 may be inserted into plate carrier 70. When so installed, projections 213, located along the outer surfaces of rings 140, 160, enable assembly 72 to fit snugly within carrier 70, eliminating any movement of assembly 72 within carrier 70. Projections 213 extend radially from the outer surfaces of rings 140, 160 and may take many forms, including those shapes illustrated in FIG. 6. Also, projections 213 may be uniformly distributed along the circumference of rings 140, 160 in some embodiments, while not uniformly distributed in others.

Plate carrier 70, containing orifice plate assembly 72, may be inserted into plate carrier guide 58 of orifice fitting 12. When so installed, orifice fitting 12 engages the radial periphery of rings 140, 160, including the region surrounding annular face groove 190 of ring 140 and the identical annular face groove of ring 160. As orifice fitting 12 engages rings 140, 160, orifice fitting 12 exerts a force on rings 140, 160 over the area of rings 140, 160 in contact with orifice fitting 12. Thus, orifice fitting 12 exerts a pressure load on rings 140, 160 equal to the force exerted on rings 140, 160 divided by the area of rings 140, 160 in contact with orifice fitting 12. To increase this pressure load, and thereby provide a better seal at these interfaces, the area of rings 140, 160 in contact with orifice fitting 12 may be reduced. Such is the function of annular face grooves 215 in rings 140, 160. By removing material from rings 140, 160 to create annular face grooves 215, the contact area between orifice fitting 12 and rings 140, 160 is reduced. Thus, the pressure load exerted by orifice fitting 12 on rings 140, 160 is increased and a better seal is provided at these interfaces.

Figure 7:
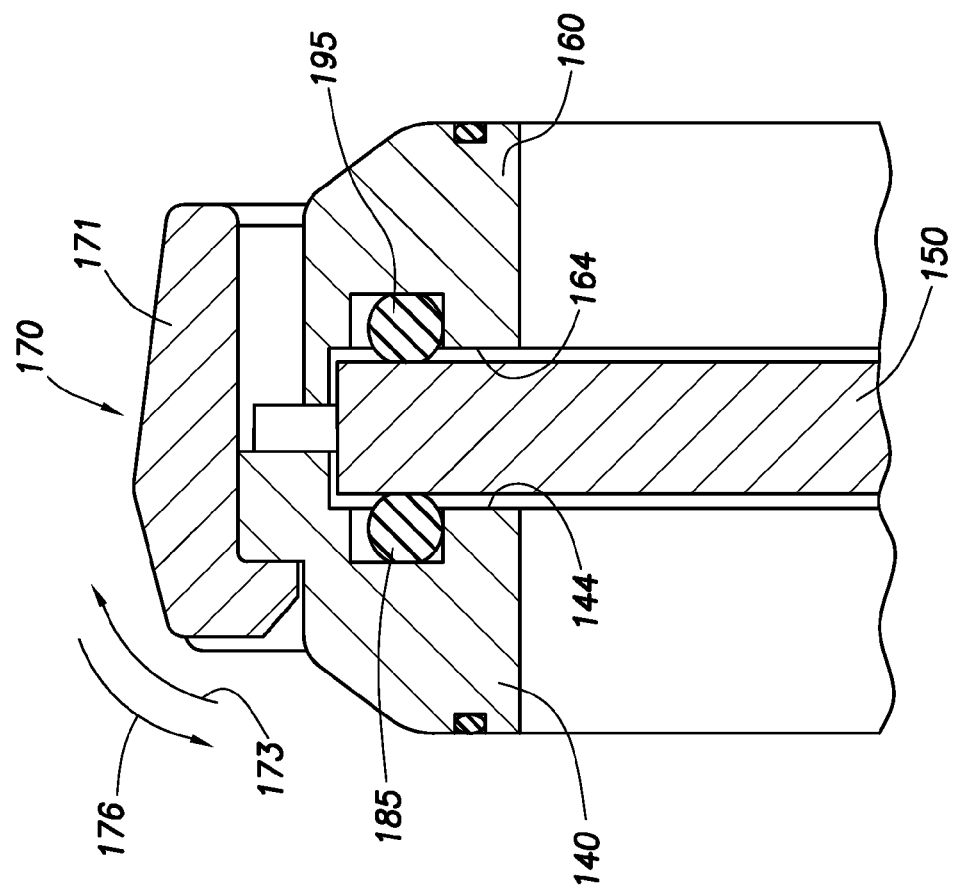
FIG. 7 is a partial cross-sectional view of the bi-directional orifice assembly of FIGS. 4 and 5 in an assembled but uninstalled configuration.

FIG. 7 is a partial cross-sectional view of the bi-directional orifice plate assembly of FIGS. 4 and 5 in an assembled configuration. In this figure, snap 170 on second ring 160 is shown engaging segment 200 (previously described with reference to FIG. 6) on first ring 140. As previously described, each ring 140, 160 includes one or more identical snaps 170 that engage one or more identical segments 200 on the other ring 160, 140. Thus, the following discussion also applies to a snap 170 on first ring 140 engaging a segment 200 on second ring 160, although the opposite configuration is illustrated in FIG. 7.

As shown in FIG. 7, snap 170 includes an extending arm 171 projecting from the outer radial surface of second ring 160. Arm 171 includes an attachment member or lip 220, best viewed in FIG. 6, at its free end distal second ring 160. Arm 171 extends in a direction substantially perpendicular to sealing surface 164 of second ring 160. In the embodiments illustrated in FIG. 7, arm 171 is integral with second ring 160, and lip 220 is integral with arm 171. Also in the embodiment illustrating in FIG. 7, lip 220, when viewed through its cross-section, generally has the shape of a hook. However, in other embodiments (not specifically illustrated), lip 220 may have any suitable geometry permitting releasable engagement with first ring 140.

Arm 171 is effectively cantilevered from the outer surface of second ring 160. As a result, arm 171 behaves like a resilient spring when flexed relative to second ring 160. Thus, when arm 171 is flexed in the direction of arrow 173, arm 171 generates a restoring force generally in the direction of arrow 176. This spring-like characteristic of arm 171 aids in maintaining snap 170 in the "locked position" shown in FIG. 7. A plurality of spring arms 171 thus are employed to secure together or unlock rings 140, 160, orifice plate 150, and O-rings 185, 195.

When orifice plate assembly 72 is in the "locked position" shown in FIG. 7, arm 171 extends from second ring 160 and across the radial surface of first ring 140 until lip 220 engages a mating notch 225, best viewed in FIG. 6, provided in a segment 200 of first ring 140. In particular, engagement of lip 220 with notch 225 prevents first ring 140 and orifice plate 150 from moving translationally relative to second ring 160. In other words, when orifice plate assembly 72 is in the "locked position," snap 170 prevents the separation of first ring 140, orifice plate 150, and second ring 160. In addition, once orifice plate assembly 72 is in the "locked position," the restoring spring feature of arm 171 resists flexion in the direction of arrow 173, which may otherwise result in disengagement of lip 220 of second ring 160 with notch 225 of first ring 140. Thus, in the "locked position" illustrated in FIG. 7, snap 170 rigidly holds together first ring 140 and a second ring 160 when an orifice plate 150 is placed therebetween. Further, when fastener 170 is in the "locked position," second ring 160 is not free to move translationally relative to first ring 140.

Orifice plate assembly 72 may be opened by flexing arm 171 with lip 220 generally in the direction of arrow 173 until lip 220 disengages notch 225. Since arm 171 exerts a restoring spring force opposing flexion, some force may be necessary to sufficiently flex arm 171 to permit disengagement of lip 220 from notch 225. When snap 170 is in the "unlocked position," first ring 140 is free to move relative to second ring 160. Once each snap 170 provided on orifice plate assembly 72 has been opened, first ring 140, second ring 160, and orifice plate 150 become disengaged and are free to be separated apart.

Prior to installation in a conduit for measuring flow, orifice plate assembly 72 is assembled. O-rings 185, 195 are inserted into grooves 181, 191 of rings 140, 160. Orifice plate 150 is then disposed between recess 142 of first ring 140 and recess 162 of second ring 160. Snaps 170 of rings 140, 160 are caused to engage segments 200 of rings 160, 140 to securely hold and align orifice plate 150 between rings 140, 160, resulting in the assembled orifice plate assembly 72 shown in FIG. 7. In this configuration, snaps 170 hold the orifice plate assembly 72 securely together, but do not cause rings 140, 160 to compress O-rings 185, 195, respectively, against orifice plate 150.

After assembly, orifice plate assembly 72 is inserted into plate carrier 70. More specifically, orifice plate assembly 72 may be inserted into opening 51 of plate carrier 70 with the outer radial region of assembly 72 in contact with ears 56. Next, plate carrier 70, containing orifice plate assembly 72, is installed in orifice fitting 12. FIG. 4 is a partial cross-sectional view of the bi-directional orifice assembly in an installed configuration.

As described above, orifice fitting 12 engages rings 140, 160 over the region including annular face grooves 215. The reduced contact area between orifice fitting 12 and rings 140, 160 due to annular face grooves 215 permits an increased pressure load on rings 140, 160, thereby maintaining a tight seal between orifice fitting 12 and rings 140, 160.

Also, as illustrated by FIG. 4, the dimensions of each component of orifice plate assembly 72 are selected such that O-rings 185, 195 are compressed when plate carrier 70 with enclosed orifice plate assembly 72 is installed in orifice fitting 12. Compression and resulting deformation of O-rings 185, 195 increases the sealing contact surface area and enhances the sealing engagement of seals 180, 190 with orifice plate 150. However, compression of O-rings 185, 195 also results in forces tending to push apart first ring 140 and second ring 160. In the "locked position," snaps 170 rigidly hold orifice plate assembly 72 together by preventing second ring 160 from moving apart from first ring 140 and orifice plate 150.

During operation, orifice fitting 12, including orifice plate assembly 72, is placed in-line with a conduit or pipeline (not shown) in order to measure flow rates, volumetric and/or mass flow rates, through the conduit. During fluid flow, small access pressure ports or pressure taps (not shown) are provided on each side of orifice plate 150 to permit the measurement of pressure differentials across orifice plate 150. The measured pressure differentials may be used to calculate fluid flow rate through orifice fitting 12.

Since orifice plate 150 partially restricts fluid flow through orifice fitting 12, the fluid pressure upstream of orifice plate 150 is greater than the fluid pressure downstream of orifice plate 150. As a result, the upstream surface of orifice plate 150 is more vulnerable to fluid leakage and loss than the downstream surface of orifice plate 150. However, a seal is provided at the upstream side of orifice plate 150 regardless of whether orifice plate assembly 72 is oriented with first ring 140 upstream or downstream of orifice plate 150. For instance, if orifice plate assembly 72 is oriented with first ring 140 upstream of orifice plate 150, seal 180 provides a reliable seal at the upstream surface of orifice plate 150. On the other hand, if orifice plate assembly 72 is oriented with second ring 160 upstream of orifice plate 150, seal 190 provides a reliable seal at the upstream surface of orifice plate 150. Thus, the bi-directional orifice plate assembly 72 provides a reliable seal (e.g., seal 180, seal 190) at the upstream surface of orifice plate 150, regardless of the orientation of orifice plate assembly 72 within orifice fitting 12.

In addition, embodiments of orifice plate assembly 72 having a seal (e.g., seal 180 and seal 190) on both sides of orifice plate 150 advantageously reduce the likelihood of fluid leakage and loss at the downstream surface of orifice plate 150. Although the downstream side of orifice plate 150 is at a lower pressure than the upstream side of orifice plate 150, and is hence less vulnerable to fluid leakage, any potential fluid leakage at the downstream surface of orifice plate 150 is reduced and/or prevented by seal 180 or seal 190, depending on the orientation of orifice plate assembly within orifice fitting 12.

As described, the positioning of seals within an orifice plate assembly both up and downstream of the orifice plate permits the orifice plate assembly to be bi-directional, eliminating leakage suffered by their conventional uni-directional counterparts when the uni-directional assemblies are inadvertently installed with the sole seal downstream of the orifice plate. Moreover, a bi-directional orifice plate assembly has the potential to provide a longer service life than their conventional uni-directional counterparts because of the ability to reverse the positions of the sealing rings in the event that the downstream ring becomes damaged. Construction of the sealing rings with integral fastening mechanisms, such as the snaps 170 described, may simplify manufacturing, in part because there is no requirement for additional parts, for example, metal clips to fasten and hold the orifice plate assembly together. In contrast to conventional orifice plate assemblies which include custom-made elastomeric seals, the use of off-the-shelf O-rings in the bi-directional orifice plate assemblies also reduces manufacturing costs for the assemblies, as well as permits the O-rings to be conveniently changed out so as to remain compatible with the gas or liquid to be measured.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modifications.

What is claimed is:

1. An orifice plate assembly comprising:
   a first ring member comprising a first facing surface and a first plurality of arms extending away from the first facing surface, said arms including latching portions; said first ring member further comprising latch-receiving recesses;
   a second ring member comprising a second facing surface and a second plurality of arms extending away from the second facing surface, said arms including latching portions; said second ring member further comprising latch-receiving recesses; and
   an orifice plate disposed between said first and second facing surfaces of said ring members;
   wherein said latching portions of arms of said first ring member engage the latch-receiving recesses of said second ring member, and said latching portions of said arms of said second ring member engage the latch-receiving recesses in said first ring member.

2. The orifice plate assembly of claim 1, wherein the latching portion of each of the first plurality of arms is operable to releasably engage one of the latch-receiving recesses in the second ring and wherein the latching portion of each of the second plurality of arms is operable to releasably engage one of the latch-receiving recesses in the first ring.

3. The orifice plate assembly of claim 1, wherein each of the first plurality of arms has a locked position in which it releasably engages the second ring member and an unlocked position wherein the ring member are free to move relative to each other and wherein each of the second plurality of arms has a locked position in which it releasably engages the first ring member and an unlocked position wherein the ring members are free to move relative to each other.

4. The orifice plate assembly of claim 1, wherein each of the first plurality of arms is integral with the first ring and each of the second plurality of arms is integral with the second ring.

5. The orifice plate assembly of claim 4, further comprising a first seal assembly disposed between the first ring member and the orifice plate and a second seal assembly disposed between the second ring member and the orifice plate.

6. The orifice plate assembly of claim 5, wherein the first seal assembly comprises an O-ring seated in an annular groove in the first ring and the second seal assembly comprises an O-ring seated in an annular groove in the second ring.

7. The orifice plate assembly of claim 1, wherein the first ring member and the second ring member are substantially identical.

8. The orifice plate assembly of claim 1, wherein each ring member comprises polytetrafluoroethylene.

9. An orifice plate assembly for an orifice fitting comprising:
- a first ring member comprising a first facing surface and a first plurality of arms extending away from the first facing surface, said arms including latching portions; said first ring member further comprising latch-receiving recesses;
- a second ring member comprising a second facing surface and a second plurality of arms extending away from the second facing surface, said arms including latching portions; said second ring member further comprising latch-receiving recesses;
- an orifice plate disposed between said first and second facing surfaces of said ring members;
- a first seal assembly disposed between the first ring and the orifice plate; and
- a second seal assembly disposed between the second ring and the orifice plate;
- wherein said latching portions of arms of said latching portions of said arms of said second ring member engage the latch-receiving recesses in said first ring member.

10. The orifice plate assembly of claim 9, wherein the first seal assembly comprises an O-ring seated in an annular groove in the first ring and the second seal assembly comprises an O-ring seated in an annular groove in the second ring.

11. The orifice plate assembly of claim 10, wherein the first seal and the second seal assemblies are substantially identical.

12. The orifice plate assembly of claim 10, wherein the latching portion of each of the first plurality of arms is operable to releasably engage one of the latch-receiving recesses in the second ring and wherein the latching portion of each of the second plurality of arms is operable to releasably engage one of the latch-receiving recesses in the first ring.

13. The orifice plate assembly of claim 12, wherein each of the first plurality of arms has a locked position releasably engaging the second ring member and an unlocked position wherein the ring members are free to move relative to each other and wherein each of the second plurality of arms has a locked position releasably engaging the first ring member and an unlocked position wherein the ring members are free to move relative to each other.

14. An orifice fitting comprising:
- a tubular body having a through passage; and
- an orifice plate assembly removably disposed within the tubular body across the through passage, the orifice plate assembly comprising:
  - an orifice plate disposed between a first ring and a second ring;
  - a first seal assembly disposed between the first ring and the orifice plate;
  - a second seal assembly disposed between the second ring and the orifice plate; and
  - a plurality of latching members extending from each ring to engage the other ring.

15. The orifice fitting of claim 14, wherein at least some of the plurality of latching members are integral to the first ring.

16. The orifice fitting of claim 15, wherein the at least some of the plurality of latching members each comprise an arm with a lip disposed at one end.

17. The orifice fitting of claim 16, wherein each lip engages a recess disposed along the periphery of the second ring.

18. The orifice fitting of claim 14, wherein at least some of the plurality of latching members are integral to the second ring.

19. The orifice fitting of claim 18, wherein the at least some of the plurality of latching members each comprise an arm with a lip disposed at one end.

20. The orifice fitting of claim 19, wherein each lip engages a recess disposed along the periphery of the second ring.

21. The orifice fitting of claim 20, wherein the first ring and the second ring are substantially identical.

22. The orifice fitting of claim 21, wherein the first and second rings comprise polytetrafluoroethylene.

23. The orifice fitting of claim 20, wherein the first and second rings are injection molded.

24. The orifice fitting of claim 14, wherein the first and the second rings each comprise an annular face groove, the annular face grooves configured to increase pressure loads exerted by the tubular body on the rings when the orifice plate assembly is disposed within the tubular body.

25. The orifice fitting of claim 14, further comprising a plate carrier configured to receive the orifice plate assembly and wherein the first and the second rings each comprise a plurality of projections, the projections configured to prevent movement of orifice plate assembly within a plate carrier.

\* \* \* \* \*